Patented Jan. 25, 1949

2,460,240

UNITED STATES PATENT OFFICE 2,460,240

RESOLUTION OF RACEMIC α HYDROXY β,β DIMETHYL γ BUTYROLACTONE

Frank D. Pickel, Flemington, N. J., and Jacob I. Fass and Saul Chodroff, Brooklyn, N. Y., assignors to Nopco Chemical Company, Harrison, N. J., a corporation of New Jersey No Drawing. Application July 4, 1945, Serial No. 603,283

7 Claims. (Cl. 260—344)

The present invention relates to the resolution of racemic α hydroxy β,β-dimethyl-γ-butyrolactone. More particularly, the present invention relates to the resolution of racemic α hydroxy β,β dimethyl γ butyrolactone by forming l-ephedrine derivatives of the d- and l-α hydroxy β,β dimethyl γ butyrolactone and separating the so-formed derivatives.

In U. S. Patent 2,319,545 there is disclosed a process for the resolution of α hydroxy β,β dimethyl γ butyrolactone by treating the lactone with an alkali such as barium or sodium hydroxide to open the ring and form the barium or sodium salt of αγ dihydroxy β,β dimethyl butyric acid and reacting the aforesaid salt with a mineral acid salt of an alkaloid such as quinine sulfate or chloride. Although the aforementioned patent discloses the use of certain other alkaloids such as quinidine, cinchonidine, cinchonine, strychnine and brucine, these other alkaloids have not been considered particularly suitable for the resolution of the lactone and in general only the quinine salts have been used. As is well known, the l-lactone is used, for example, in the synthesis of d-pantothenic acid.

It has been discovered in accordance with the present invention that l-ephedrine can be used to resolve racemic α hydroxy β,β dimethyl γ butyrolactone. Furthermore, l-ephedrine can be reacted directly with the lactone with the resultant opening of the ring to produce the corresponding l-ephedrine d-αγ dihydroxy β,β dimethyl butyric acid and l-ephedrine l-αγ dihydroxy β,β dimethyl butyric acid compounds. Thereafter the l-ephedrine l-αγ dihydroxy β,β dimethyl butyric acid and l-ephedrine d-αγ dihydroxy β,β dimethyl butyric acid compounds can be separated from one another and from the unresolved racemic lactone by crystallization from suitable solvents.

It is one of the objects of the present invention, therefore, to provide an economical method for the resolution of α hydroxy β,β dimethyl γ butyrolactone.

A second object of the present invention is to produce novel derivatives of l-ephedrine and αγ dihydroxy β,β dimethyl butyric acid.

A third object of the present invention is to prepare substantially pure l-and d-α hydroxy β,β dimethyl γ butyrolactones by reacting a racemic lactone with l-ephedrine in aqueous solution and thereafter separating the l-ephedrine derivatives by crystallization and/or extraction by means of suitable organic solvents.

Other objects and advantages of the present invention will become apparent from the specification and claims.

In practicing the process of the present invention racemic α hydroxy β,β dimethyl γ butyrolactone is reacted directly in aqueous solution with l-ephedrine to form a mixture of l-ephedrine l-αγ dihydroxy β,β dimethyl butyric acid and l-ephedrine d-αγ dihydroxy β,β dimethyl butyric acid. The water is then removed from the mixture under vacuum while maintaining a temperature below approximately 70° C. inasmuch as the ephedrine salts are unstable above this temperature. A suitable solvent such as ethylene dichloride or methyl isobutyl ketone is then added and the solution seeded with l-ephedrine l-butyric acid (equivalent to the di-lactone derivative) and cooled to precipitate the l-ephedrine l-butyric acid. Other suitable solvents may also be used as, for example, methylene chloride, trichlor-ethylene, isopropyl acetate, mixed amyl alcohols, carbon tetrachloride, benzene, etc. However, the preferred solvents are methyl isobutyl ketone and ethylene dichloride. The salt is then removed and thereafter the residue is concentrated to remove the solvent. To the remaining syrup, water and sodium hydroxide are added to split the l-ephedrine d-butyric acid and such l-ephedrine l-butyric acid as has not been removed by the crystallization. The solution is then heated for approximately ½ hour to 100° C. to convert the l-ephedrine-butyric acid compounds to the sodium salt of the corresponding hydroxy butyric acid compounds, liberating the free ephedrine base; the solution is then cooled and the ephedrine removed by extraction with methyl isobutyl ketone or any suitable organic solvent immiscible with water since ephedrine is soluble in substantially all organic solvents. After removal of the ephedrine the aqueous layer is acidified to a pH of approximately 1 with concentrated hydrochloric acid and heated for a period of time sufficient to lactonize the hydroxy acid. After the lactone is reconstituted, the solution is cooled to room temperature, preferably neutralized with sodium or potassium carbonate and the lactone extracted with a suitable organic solvent as, for example, methylene chloride. Any other solvent for the lactone may also be used in this step such as ether, benzene, or carbon tetrachloride. The extracts are then combined, dried and solvent removed by distillation. The crude l-lactone obtained may then be further purified by successive recrystallizations from methyl isobutyl ketone. It is to be noted that upon dissolving the crude lactone in a solvent such as methyl isobutyl ketone and cooling, the l-lactone crystallizes away from the residual, d,l-lactone. Two crystallizations from methyl isobutyl ketone yielded an l-lactone with a specific rotation of −49.7°. Other solvents which may be used for this last step are mixtures of benzene and petroleum ether, methyl isobutyl ketone and petroleum ether, also n-amyl alcohol, n-butyl alcohol and fusel oil. Of these, however, the highly preferred solvents are benzene and petroleum ether mixture, methyl isobutyl ketone and petroleum ether mixtures, and methyl isobutyl ketone itself. By far the best solvent for the purpose is methyl isobutyl ketone.

Instead of the direct reaction of l-ephedrine and racemic lactone, the salts of ephedrine may be used, as, for example, ephedrine sulfate and the Ba salt of the lactone may be interacted to produce l-ephedrine and d- and l-lactone derivatives together with barium sulfate which is precipitated and separated. The l-ephedrine d- and l-lactone (l-ephedrine-l-butyric acid and l-ephedrine d-butyric acid) derivatives may also be separated in substantially pure form from one another and thereafter lactonized instead of utilizing a partial separation as previously outlined followed by separation of the l-lactone from the mixture of l-lactone and d-l-lactone.

The following examples serve to illustrate but are not intended to limit the present invention.

*Example I*

2600 gs. of racemic α hydroxy β,β dimethyl γ butyro-lactone were dissolved in 3000 cc. of water. 3300 gs. of l-ephedrine were added and the solution was heated at 90° for ½ hour. The water was then removed under vacuum (the temperature of the reaction mass during removal of water was kept below 70° C.). The residual thick syrup still contained 5% H$_2$O. The syrup was dissolved in 6600 cc. of methyl isobutyl ketone, seeded with a few crystals of l-ephedrine-l αγ dihydroxy β,β dimethyl butyric acid and placed in an ice box at 3° C. for three days. The white precipitate of l-ephedrine-l αγ dihydroxy β,β dimethyl butyric acid was filtered and washed by slurring with 600 cc. cold methyl isobutyl ketone. The precipitate, after drying, weighed 2053 gs. and had a M. P. of 110° The washings were combined with the filtrate.

The methyl isobutyl ketone from the filtrate and washings of the salt of l-ephedrine-d-butyric acid was removed under vacuum. To the remaining syrup 2100 cc. of water and 800 cc. of 50% NaOH solution were added to split the ephedrine butyric acid salt (l-ephedrine-d-butyric acid and the l-ephedrine-l-butyric acid not removed by crystallization). The ephedrine separated as an oily layer. The solution was heated for ½ hour to convert the butyric acid compound to the sodium salt of the acid. The solution was cooled and the ephedrine removed by two extractions with methyl isobutyl ketone (1500 and 1000 cc). The extracts were saved for recovery of ephedrine. The aqueous layer after removal of ephedrine was acidified to pH-1 with concentrated HCl and heated for one hour at 90° to lactonize the hydroxy acid. After lactonization the solution was cooled to room temperature and neutralized with solid K$_2$CO$_3$ to pH 6.8. The lactone was extracted with 6 portions of 1600 cc. each of methylene chloride. The extracts were dried over Na$_2$SO$_4$ and the solvent removed by distillation. 1550 gs. crude l-α hydroxy, β,β dimethyl γ butyrolactone were obtained. Vacuum distillation yielded 1425 gs. of a white lactone having an $[\alpha]_D$ −21.2°.

The 1425 gs. of l-α hydroxy β,β dimethyl γ butyrolactone ($[\alpha]_D$ −21.2°) were dissolved in 920 cc. of methyl isobutyl ketone. The solution after seeding with l-α hydroxy β,β dimethyl γ butyrolactone was placed in an ice box at +3° for five days. The crystallized l-α hydroxy β,β dimethyl γ butyrolactone was filtered, sucked dry, washed by slurring with 300 cc. cold methyl isobutyl ketone, refiltered and washed with 200 cc. petroleum ether. The crystal weighed 495 gs. and had a specific rotation of −46.6°.

The mother liquors and washings of this crystallization yielded (on distillation of the solvents) 910 gs. of a lactone with a specific rotation of −9.8°.

The solid l-ephedrine-d-lactone derivative (l-ephedrine-l-butyric acid) was dissolved in water and split with sodium hydroxide solution. The ephedrine was extracted with methyl isobutyl ketone, and the aqueous layer acidified and worked up in the same manner as was the solution containing l-lactone derivative. The extracts of the solution yielded 785 gs. of d-lactone ($[\alpha]_D$ +39.9°).

The methyl isobutyl ketone solutions of ephedrine were washed two times with saturated solutions of NaCl (1000 cc. each wash), dried over Na$_2$SO$_4$, filtered, and solvent removed by distillation. Ephedrine recovery was 3110 gs.

A 20 gm. sample of l-α hydroxy β,β dimethyl γ butyro-lactone $[\alpha]_D$ −46.6° was dissolved in 10 cc. methyl isobutyl ketone by heating. After cooling to room temperature, 10 cc. of petroleum ether were added. A precipitate formed immediately. The solution was placed in the ice box for two hours. The precipitate was filtered, the weight was 17.8 gs. yielding l-α hydroxy β,β dimethyl γ butyrolactone with a specific rotation of −49.7°. This yield of 17.8 gs. represents 96% of the available l-lactone in the 20 gs. of starting material.

*Example II*

8.25 gs. of l-ephedrine, 11.18 gs. of the barium salt of racemic α hydroxy β,β dimethyl γ butyrolactone were reacted in 49.6 cc. of 1.008 N H$_2$SO$_4$. The barium sulfate formed was filtered, pH of filtrate 5. Water was then removed under a vacuum at 40° C. 50 cc. of ethylene dichloride were then added to the syrup and the solution was cooled, 2 gs. of precipitate were formed. Recrystallization of this precipitate from ethylene dichloride yielded crystals having a melting point of 110.5–111.5° C. This material when split and lactonized in the usual manner gave a lactone having a rotation of +47°. The original precipitate, therefore, is substantially pure l-ephedrine d-lactone derivative (l-ephedrine-l-αγ dihydroxy β,β dimethyl butyric acid).

The mother liquor from the above was concentrated to a syrup and 10 cc. of ethylene dichloride and 10 cc. of petroleum ether were then added; upon cooling a further precipitate of l-ephedrine d-lactone derivative was obtained. Thereafter, the filtrate was evaporated to a syrup and 10 cc. of isopropyl acetate added. After standing 4 days a precipitate having a melting point of 79–80° C., upon recrystallization from isopropyl acetate, was obtained. Upon splitting and lactonization, a lactone was obtained having a specific rotation of −45°. The precipitate having a melting point of 79–80° C. was therefore substantially pure l-ephedrine l-lactone derivative (l-ephedrine-d-αγ dihydroxy β,β dimethyl butyric acid).

Having described our invention what we claim as new and desire to secure by Letters Patent is:

1. In a process for the resolution of racemic α hydroxy β,β dimethyl γ butyrolactone the step which comprises reacting the lactone with l-epehedrine to form an l-ephedrine derivative of d-αγ dihydroxy β,β dimethyl butyric acid and an l-ephedrine derivative of l-αγ dihydroxy β,β dimethyl butyric acid at a temperature below the decomposition temperatures of said ephedrine derivatives.

2. A process for the resolution of racemic α hydroxy β,β dimethyl butyrolactone which comprises reacting the aforesaid lactone with l-ephedrine to form an l-ephedrine derivative of l-αγ dihydroxy β,β dimethyl butyric acid and an l-ephedrine derivative of d-αγ dihydroxy β,β dimethyl butyric acid at a temperature below the composition temperatures of said ephedrine derivatives, dissolving the reaction products in a solvent for said ephedrine derivatives and removing the l-ephedrine derivative of l-αγ dihydroxy β,β dimethyl butyric acid from the solution by crystallization therefrom.

3. As a new compound a salt selected from the group consisting of an l-ephedrine salt of d-αγ dihydroxy β,β dimethyl butyric acid and an l-ephedrine salt of l-αγ dihydroxy β,β dimethyl butyric acid.

4. As a new compound the l-ephedrine salt of d-αγ dihydroxy β,β dimethyl butyric acid.

5. As a new compound the l-ephedrine salt of l-αγ dihydroxy β,β dimethyl butyric acid.

6. A process for the resolution of racemic α hydroxy β,β dimethyl γ butyrolactone which comprises reacting the aforesaid lactone with l-ephedrine to form an l-ephedrine derivative of l-αγ dihydroxy β,β dimethyl butyric acid and an l-ephedrine derivative of d-αγ dihydroxy β,β dimethyl butyric acid at a temperature below the decomposition temperatures of said ephedrine derivatives, dissolving the reaction products in a solvent for said ephedrine derivatives, removing the l-ephedrine derivative of l-αγ dihydroxy β,β dimethyl butyric acid from the solution by crystallization, removing the solvent from the solution comprising mainly crude l-ephedrine derivative of d-αγ dihydroxy β,β dimethyl butyric acid, lactonizing the l-ephedrine d-αγ dihydroxy β,β dimethyl butyric acid to produce crude l-α hydroxy β,β dimethyl γ butyrolactone, dissolving the crude l-lactone in a solvent for the l-lactone and cooling the solution to crystallize substantially pure l-α hydroxy β,β dimethyl γ butyrolactone therefrom.

7. A process for the resolution of racemic α hydroxy β,β dimethyl γ butyrolactone which comprises reacting the aforesaid lactone with l-ephedrine to form an l-ephedrine derivative of l-αγ dihydroxy β,β dimethyl butyric acid and an l-ephedrine derivative of d-αγ dihydroxy β,β dimethyl butyric acid at a temperature below the decomposition temperatures of said ephedrine derivatives, dissolving the reaction products in a solvent for said ephedrine derivatives, removing the l-ephedrine derivative of l-αγ dihydroxy β,β dimethyl butyric acid from the solution by crystallization, removing the solvent from the solution comprising mainly crude l-ephedrine derivative of d-αγ dihydroxy β,β dimethyl butyric acid, lactonizing the l-ephedrine d-αγ dihydroxy β,β dimethyl butyric acid to produce crude l-α hydroxy β,β dimethyl γ butyrolactone, dissolving the crude lactone in methyl isobutyl ketone, and cooling the solution to crystallize substantially pure l-α hydroxy β,β dimethyl γ butyrolactone therefrom.

FRANK D. PICKEL.
JACOB I. FASS.
SAUL CHODROFF.

REFERENCES CITED

The following references are of record in the file of this patent:

UNITED STATES PATENTS

| Number | Name | Date |
|---|---|---|
| 2,319,545 | Harris et al. | May 18, 1943 |
| 2,328,000 | Finkelstein | Aug. 31, 1943 |

OTHER REFERENCES

Organic Chemistry—An Advanced Treatise, by Gilman, vol. I, 2nd edition (1943) pp. 254–259.